US012054356B2

(12) United States Patent
Vishal

(10) Patent No.: US 12,054,356 B2
(45) Date of Patent: Aug. 6, 2024

(54) MODULAR CABIN ASSEMBLY FOR AN ELEVATOR AND A METHOD TO OPERATE THE SAME

(71) Applicant: Ruphavathy Vishal, Chennai (IN)

(72) Inventor: Ruphavathy Vishal, Chennai (IN)

(73) Assignee: Ruphavathy Vishal (IN)

( * ) Notice: Subject to any disclaimer, the term of this patent is extended or adjusted under 35 U.S.C. 154(b) by 0 days.

(21) Appl. No.: 18/374,064

(22) Filed: Sep. 28, 2023

(65) Prior Publication Data

US 2024/0228233 A1 Jul. 11, 2024

(30) Foreign Application Priority Data

Jan. 9, 2023 (IN) ............................ 202341001859

(51) Int. Cl.
*B66B 11/02* (2006.01)
*B66B 9/04* (2006.01)
*B66B 19/04* (2006.01)

(52) U.S. Cl.
CPC ............ *B66B 11/0206* (2013.01); *B66B 9/04* (2013.01); *B66B 11/0226* (2013.01); *B66B 19/04* (2013.01)

(58) Field of Classification Search
CPC ............. B66B 11/0206; B66B 11/0226; B66B 11/0253
See application file for complete search history.

(56) References Cited

U.S. PATENT DOCUMENTS 4,700,809 A * 10/1987 Lazar .................. B66B 11/0206 187/401
6,209,686 B1 * 4/2001 Tomasetti ........... B66B 11/0226 187/401
10,351,388 B2 * 7/2019 Ascua ....................... B66B 9/04
11,414,302 B1 * 8/2022 De Ledebur ............ B66B 19/00
11,518,653 B2 * 12/2022 De Ledebur ........ B66B 11/0005
11,780,707 B1 * 10/2023 de Ledebur ............. B66B 7/048 187/408
11,834,297 B1 * 12/2023 de Ledebur .......... F16J 15/3284
11,919,743 B2 * 3/2024 Darnley, III ........ B66B 11/0206
2014/0305749 A1 * 10/2014 Manner ............... B66B 11/0226 187/401
2018/0237267 A1 * 8/2018 Coldre .................. F16B 5/0084
2018/0370767 A1 * 12/2018 Salin ................... B66B 11/0226
2018/0370769 A1 * 12/2018 Häivälä ............... B66B 11/0206
(Continued)

FOREIGN PATENT DOCUMENTS

EP 0550904 B1 8/1996

*Primary Examiner* — Michael A Riegelman
(74) *Attorney, Agent, or Firm* — Jason C. Cameron

(57) ABSTRACT

A modular cabin assembly 100 for an elevator 200 is provided. The assembly includes a housing 102 which includes a roof assembly 104, and a floor assembly 118. The roof assembly includes a plurality of first connectors 106 connected with a plurality of perforated brackets 108 and coupled with a plurality of vertical posts 110 and is coupled with each other by means of a plurality of joints 114. Each of the plurality of joints includes a projection 116 at the top face of each joint. The floor assembly includes a plurality of protruding portions 120, and a covering structure 122. A first pillar 128*a*, a second pillar 128*b*, and a fourth pillar 128*d* of at least four pillars 128 coupled with the roof assembly and the floor assembly. A third pillar 128*c* at least four pillars comprise a second vertical post guide rail, coupled with the roof assembly.

11 Claims, 11 Drawing Sheets

(56) References Cited

U.S. PATENT DOCUMENTS

| | | | | |
|---|---|---|---|---|
| 2020/0165838 | A1* | 5/2020 | Thomas | E04H 15/48 |
| 2020/0331726 | A1* | 10/2020 | Jagdale | B66B 11/0206 |
| 2021/0179388 | A1* | 6/2021 | Darnley, III | B66B 7/024 |
| 2022/0324678 | A1* | 10/2022 | De Ledebur | B66B 11/0005 |

* cited by examiner

MODULAR CABIN ASSEMBLY FOR AN ELEVATOR AND A METHOD TO OPERATE THE SAME

CROSS-REFERENCE TO RELATED APPLICATION

This Application claims priority from a Patent application filed in India having Patent Application No. 202341001859, filed on Jan. 9, 2023, and titled "A MODULAR CABIN ASSEMBLY FOR AN ELEVATOR AND A METHOD TO OPERATE THE SAME".

FIELD OF INVENTION

Embodiments of the present disclosure relate to elevators and more particularly to a modular cabin assembly for an elevator and a method to operate the same.

BACKGROUND

Elevators are used in the transportation of goods or passengers. The elevators are used in structures such as huge residential buildings, hospitals, shopping malls, and the like. Each structure has its shape and size; thus, each structure requires a different type and size of an elevator. In a conventional approach, mechanical elevators use countervailing weights in order to facilitate moving up and down a passenger cabin. Such elevators require a great deal of space, maintenance, equipment, and machinery. The elevator needs to be rigid for carrying the goods or passengers. Such rigid elevators are heavy cabin may result in larger and/or more powerful elevator components, most significantly a more powerful elevator drive system may be needed to be used.

Conventionally, during setting up the elevator, the elevator system requires personnel to spend more time, effort, and overall knowledge of the construction of the basic structures of the elevator system. The elevator systems require more time to set up the machinery's basic structures required. Also, the elevators required to install components such as electronics, cabling, and the like. In some structures, the elevators are not used for a long time. In such cases, it is important to dismantle the elevator for avoiding the future problems. Also, for shifting purposes the dismantling and assembling of the elevator is not easy in the current elevators. Further, currently, the existing elevator systems does not facilitate easy mobility of an elevator cabin. The existing elevator system does not provide comfortable packaging of the elevator. The currently existing elevators are bulkier, which became difficult for logistics and also for technicians to carry inside the building door.

Hence, there is a need for a modular cabin assembly for an elevator and a method to operate the same to address the aforementioned issue(s).

BRIEF DESCRIPTION

In accordance with an embodiment of the present disclosure, a modular cabin assembly is provided. The modular cabin assembly includes a housing configured to move vertically. The housing includes a roof assembly, a floor assembly, and at least four pillars. The roof assembly includes a plurality of first connectors configured to be connected with a plurality of perforated brackets. The plurality of perforated brackets is operatively coupled to a plurality of vertical posts. The plurality of vertical posts is operatively coupled with the plurality of perforated brackets by means of a plurality of fasteners, thereby forming a closed structure of the housing. The plurality of vertical posts is operatively coupled with each other by means of a plurality of joints. Each of the plurality of joints comprises a projection at a top face of the joint. The floor assembly is operatively coupled with the roof assembly, wherein the floor assembly includes a plurality of protruding portions and a covering structure. The plurality of protruding portions, positioned at a predefined location creates a gap between each of the plurality of projections. The covering structure is configured with a plurality of second connectors forming a covering for a plurality of cables of the elevator. At least four pillars are operatively connected the roof assembly and the floor assembly. A first pillar of the at least four pillars operatively coupled with the roof assembly, by means of a first vertical post of the plurality of vertical posts. The first pillar of the at least four pillars is operatively coupled with the floor assembly by means of a first perforated bracket of the plurality of perforated brackets, wherein the first perforated bracket accommodates a first fastener of the plurality of fasteners for coupling the first pillar with the floor assembly. A second pillar of the at least four pillars operatively coupled with the roof assembly by means of a first vertical post guide rail. The second pillar of the at least four pillars operatively coupled with the floor assembly by means of a second perforated bracket of the plurality of perforated brackets at the bottom for accommodating a second fastener of the plurality of fasteners for coupling with floor assembly. A third pillar of the at least four pillars include a second vertical post guide rail. The second vertical post guide rail is configured to be coupled with the roof assembly. A fourth pillar of the at least four pillars operatively coupled with the roof assembly by means of a third vertical post with a third perforated bracket of the plurality of brackets. The third perforated bracket comprises a third set of a plurality of welded nuts. The fourth pillar is operatively coupled with the floor assembly by means of a fourth perforated bracket at the bottom for accommodating a third fastener of the plurality of fasteners for coupling with the floor assembly.

In accordance with another embodiment of the present disclosure, a method to operate the modular cabin assembly for the elevator is provided. The method includes connecting, by a plurality of first connectors of a housing, a roof assembly with a plurality of perforated brackets. The method also includes forming, by a plurality of vertical posts of the housing, a closed structure of the housing by coupling with the plurality of perforated brackets by means of a plurality of fasteners. Further, the method includes projecting, by the plurality of vertical posts of the housing, on the top of a plurality of joints, wherein the plurality of vertical posts is operatively coupled with each other by means of a plurality of joints. Furthermore, the method includes creating, by a plurality of protruding portions of a floor assembly, a gap between each of the plurality of projections. Furthermore, the method includes covering, by a covering structure of the floor assembly, a plurality of cables of the elevator. Furthermore, the method includes connecting, by a first pillar of at least four pillars, with the roof assembly, by means of a first vertical post of the plurality of vertical post. Furthermore, connecting, by a first perforated bracket of the first pillar of the at least four pillars, the floor assembly with the second pillar for accommodating, a first fastener of the plurality of fasteners for coupling the first pillar with the floor assembly. Furthermore, the method includes connecting, by a first vertical post guide rail of a second pillar of the at least four pillars, the roof assembly for accommodating a second fastener of the plurality of fasteners for coupling with floor assembly by coupling the floor assembly by means of a second perforated bracket of the plurality of perforated brackets at the bottom. Furthermore, connecting, a third pillar of at least four pillars, a second vertical post guide rail with the roof assembly. Furthermore, connecting, by a fourth perforated bracket of the at least four pillars, the floor assembly with the fourth pillar for accommodating, by a fourth pillar of the at least four pillars, a third fastener of the plurality of fasteners for coupling with the floor assembly.

In accordance with yet another embodiment of the present disclosure, a pneumatic vacuum is provided. The elevator includes an external cylinder assembly including a modular elevator cabin assembly inserted therein. The external cylinder assembly includes a plurality of cylinders coupled using a base ring assembly and a band ring assembly. The modular elevator cabin assembly includes a housing configured to move vertically. The housing includes a roof assembly which further includes a plurality of first connectors configured to be connected with a plurality of perforated brackets. The plurality of perforated brackets is operatively coupled to a plurality of vertical posts. The plurality of vertical posts is operatively coupled with the plurality of perforated brackets by means of a plurality of fasteners, thereby forming a closed structure of the housing. The plurality of vertical posts is operatively coupled with each other by means of a plurality of joints. Each of the plurality of joints comprises a projection at a top face of each joint. A floor assembly is operatively coupled with the roof assembly. The floor assembly includes a plurality of protruding portions, positioned at a predefined location creating a gap between each of the plurality of protruding portions. The floor assembly also includes a covering structure configured with a plurality of second connectors forming a covering for a plurality of cables of the elevator. The housing includes at least four pillars operatively connected to the roof assembly and the floor assembly. A first pillar of the at least four pillars operatively coupled with the roof assembly by means of a first vertical post of the plurality of vertical posts. The first pillar of the at least four pillars operatively coupled with the floor assembly by means of a first perforated bracket of the plurality of perforated brackets, wherein the first perforated bracket accommodates a first fastener of the plurality of fasteners for coupling the first pillar with the floor assembly. A second pillar of the at least four pillars is operatively coupled with the roof assembly by means of a first vertical post guide rail. A second pillar of the at least four pillars operatively coupled with the floor assembly by means of a second perforated bracket of the plurality of perforated brackets at the bottom for accommodating a second fastener of the plurality of fasteners for coupling with floor assembly. A third pillar of the at least four pillars includes a second vertical post guide rail. The second vertical post guide rail is configured to be coupled with the roof assembly. A fourth pillar of the at least four pillars is operatively coupled with the roof assembly by means of a second vertical post with a third perforated bracket of the plurality of brackets. A fourth pillar of the at least four pillars operatively coupled with the floor assembly by means of a fourth perforated bracket at the bottom for accommodating a third fastener of the plurality of fasteners for coupling with the floor assembly. The elevator) further includes a polycarbonate sheet configured to cover the external cylinder assembly.

The polycarbonate sheet and the external cylinder assembly is coupled using a first locking device and a second locking device, wherein the first locking device is configured to lock an air gap between the polycarbonate sheet, the base ring assembly, and the external cylinder assembly and the second locking device is configured to lock air gap between the polycarbonate sheet and the guide rail pillar. The elevator also includes a seal assembly adapted to fit over a top portion of the elevator cabin. The seal assembly is configured to seal the elevator cabin to reduce vibrations during the upward and downward movement of the elevator cabin. The seal assembly includes a depressurizing system configured to prevent the elevator cabin from coming into force contact with the external cylinder assembly during upward movement and contribute to the safety of an elevator operation. Furthermore, the elevator includes an electronic control unit located on top of the external cylinder assembly.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
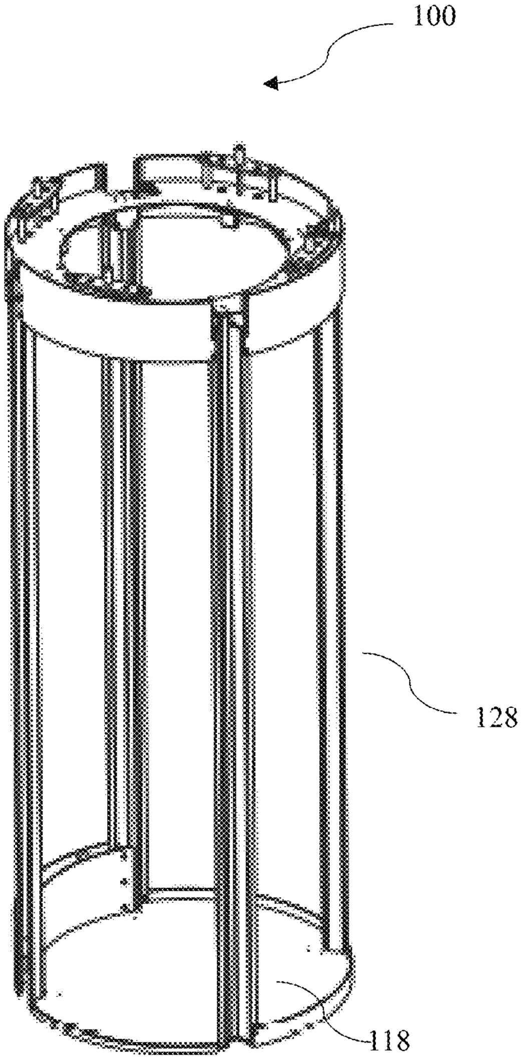
FIG. 1 is a schematic representation of a perspective view of a modular cabin assembly for an elevator in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a modular cabin assembly and a method to operate the same. The modular cabin assembly includes a housing configured to move vertically. The housing includes a roof assembly, a floor assembly, and at least four pillars. The roof assembly includes a plurality of first connectors configured to be connected with a plurality of perforated brackets. The plurality of perforated brackets is operatively coupled to a plurality of vertical posts. The plurality of vertical posts is operatively coupled with the plurality of perforated brackets by means of a plurality of fasteners, thereby forming a closed structure of the housing. The plurality of vertical posts is operatively coupled with each other by means of a plurality of joints. Each of the plurality of joints comprises a projection at a top face of the joint. The floor assembly is operatively coupled with the roof assembly, wherein the floor assembly includes a plurality of protruding portions and a covering structure. The plurality of protruding portions, positioned at a predefined location creates a gap between each of the plurality of projections.

The covering structure is configured with a plurality of second connectors forming a covering for a plurality of cables of the elevator. At least four pillars are operatively connected the roof assembly and the floor assembly. A first pillar of the at least four pillars operatively coupled with the roof assembly, by means of a first vertical post of the plurality of vertical posts. The first pillar of the at least four pillars is operatively coupled with the floor assembly by means of a first perforated bracket of the plurality of perforated brackets, wherein the first perforated bracket accommodates a first fastener of the plurality of fasteners for coupling the first pillar with the floor assembly. A second pillar of the at least four pillars operatively coupled with the roof assembly by means of a first vertical post guide rail. The second pillar of the at least four pillars operatively coupled with the floor assembly by means of a second perforated bracket of the plurality of perforated brackets at the bottom for accommodating a second fastener of the plurality of fasteners for coupling with floor assembly. A third pillar of the at least four pillars include a second vertical post guide rail. The second vertical post guide rail is configured to be coupled with the roof assembly. A fourth pillar of the at least four pillars operatively coupled with the roof assembly by means of a third vertical post with a third perforated bracket of the plurality of brackets. The third perforated bracket comprises a third set of a plurality of welded nuts. The fourth pillar is operatively coupled with the floor assembly by means of a fourth perforated bracket at the bottom for accommodating a third fastener of the plurality of fasteners for coupling with the floor assembly.

Figure 2:
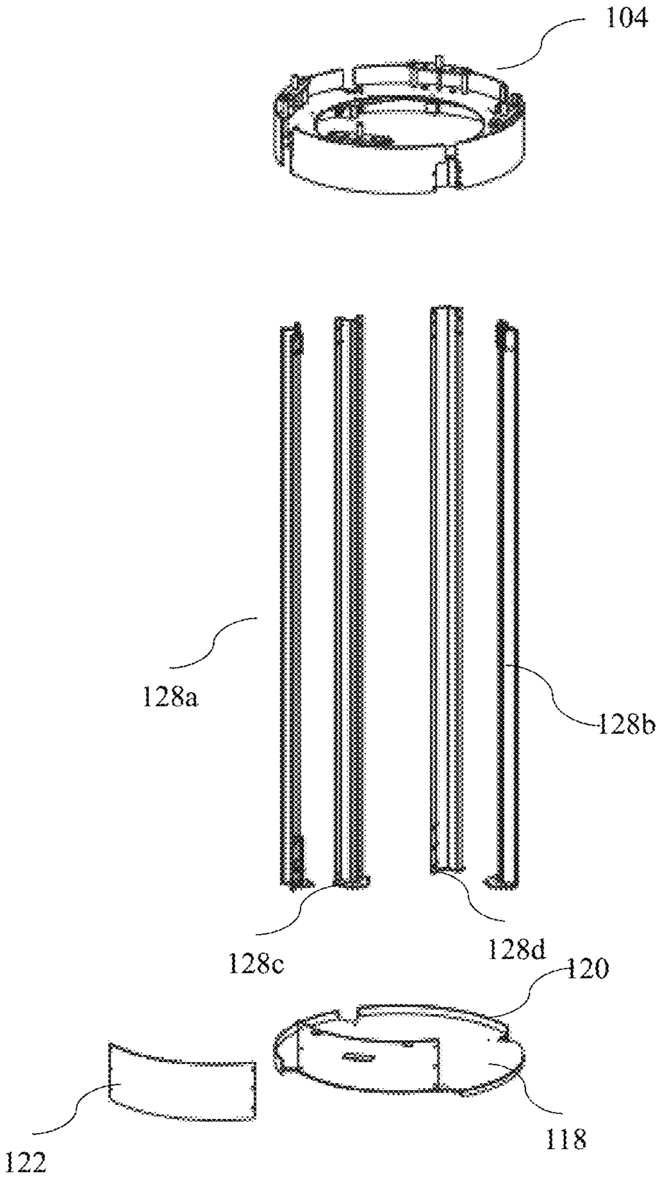
FIG. 2 is a schematic representation of an exploded view of the modular cabin assembly of FIG. 1 in accordance with an embodiment of the present disclosure.

FIG. 1 is a perspective view of a modular cabin assembly 100 of an elevator in accordance with an embodiment of the present disclosure and FIG. 2 is an exploded view of the modular cabin assembly 100 of an elevator of FIG. 1 in accordance with an embodiment of the present disclosure.

The modular cabin assembly 100 includes a housing 102 configured to move vertically. The housing includes a roof assembly 104, a floor assembly 118, and at least four pillars 128.

In one embodiment, the housing may include a cylindrical shape. In one embodiment, the housing 102 is adapted to provide modularity for being dismantled and assembled. In one embodiment, the plurality of joints 114 is elliptically shaped and includes a cylindrical projection on the top face of the joint of the plurality of joints 114.

Figure 3A:
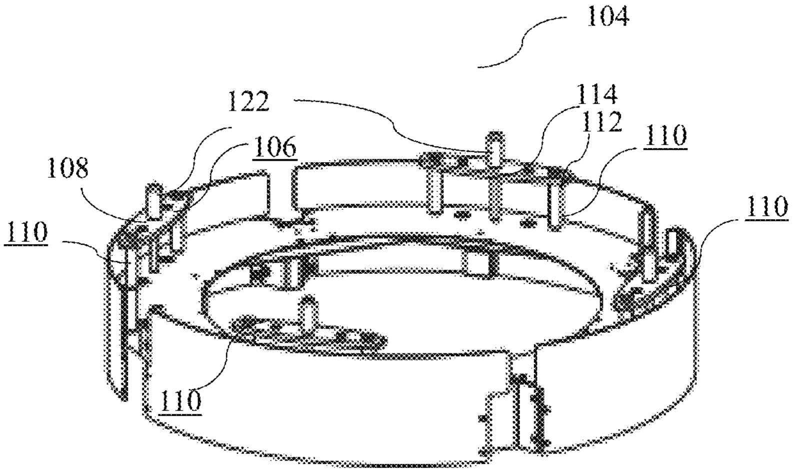
FIG. 3*a* is a schematic representation of a perspective view of a roof assembly of modular cabin assembly of FIG. 1 in accordance with an embodiment of the present disclosure.

FIG. 3*a* is a perspective view of the roof assembly (104) of the modular cabin assembly of FIG. 1 in accordance with an embodiment of the present disclosure. The roof assembly (104) includes a plurality of first connectors (106) configured to be connected with a plurality of perforated brackets (108). The plurality of perforated brackets (108) is operatively coupled to a plurality of vertical posts (110). The plurality of vertical posts (110) is operatively coupled with the plurality of perforated brackets (108) by means of a plurality of fasteners (112), thereby forming a closed structure of the housing (102). Also, the plurality of vertical posts (112) is operatively coupled with each other by means of a plurality of joints (114). Each of the plurality of joints (114) includes a projection at a top face of each join.

Figure 3B:
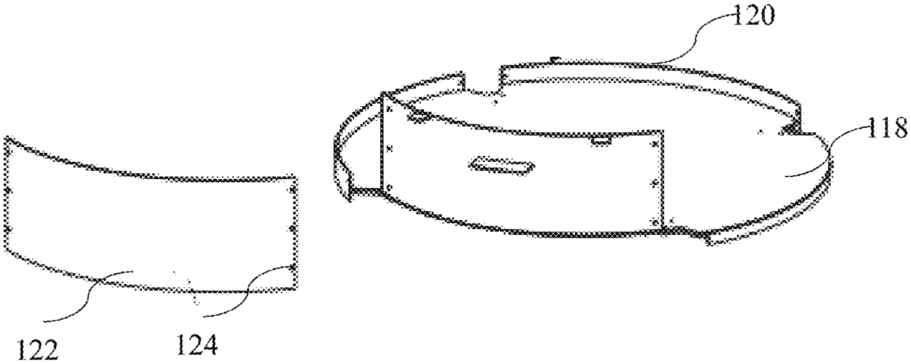
FIG. 3(*b*) is a schematic representation of a floor assembly of modular cabin assembly of FIG. 1 in accordance with an embodiment of the present disclosure.

FIG. 3*b* is a perspective view of the floor assembly (118) of the modular cabin assembly of FIG. 1 in accordance with an embodiment of the present disclosure. The floor assembly (118) is operatively coupled with the roof assembly (102). The floor assembly (118) includes a plurality of protruding portions (120) and a covering structure (122). The plurality of protruding portions (120) is positioned at a predefined location creating a gap between each of the plurality of protruding portions (120). The covering structure (122) is configured with a plurality of second connectors (124) forming a covering for a plurality of cables of the elevator (200, FIG. 9).

Figure 4:
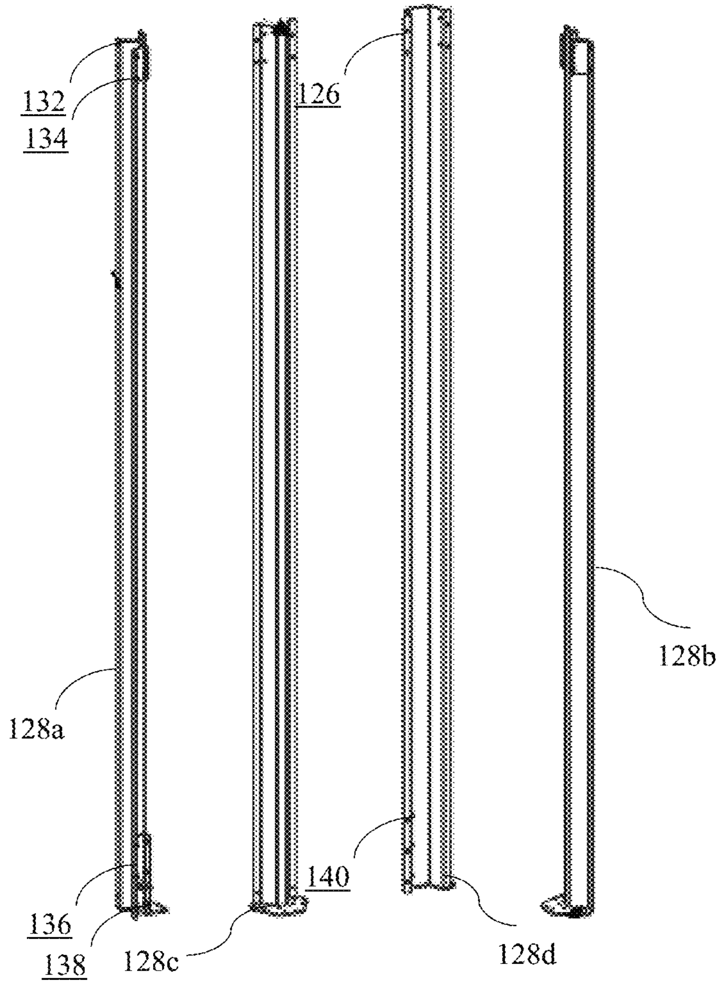
FIG. 4 is a schematic representation of a perspective view of at least four pillars of the modular cabin assembly of FIG. 1, in accordance with an embodiment of the present disclosure.

FIG. 4 is a perspective view of at least four pillars of the modular cabin assembly of FIG. 1 in accordance with an embodiment of the present disclosure. At least four pillars (128) are operatively connected the roof assembly (104) and the floor assembly (118, FIG. 3*a*). A first pillar 128*a* of the at least four pillars (128*a*, 128*b*, 128*c*, 128*d*) is operatively coupled with the roof assembly (102) by means of a first vertical post (not shown in FIG. 4) of the plurality of vertical posts (110, FIG. 3*a*). The first pillar (128*a*) is operatively coupled with the floor assembly (118, FIG. 3*b*) by means of a first perforated bracket (not shown in FIG. 4) of the plurality of perforated brackets (108). The first perforated bracket (not shown in FIG. 4) accommodates a first fastener (not shown in FIG. 4) of the plurality of fasteners (112) for coupling the first pillar with the floor assembly (118).

A second pillar (128*b*) of the at least four pillars operatively coupled with the roof assembly (102) by means of a first vertical post guide rail (not shown in FIG. 4). The second pillar (not shown in FIG. 4) is operatively coupled with the floor assembly (118) by means of a second perforated bracket (not shown in FIG. 4) of the plurality of perforated brackets (108, FIG. 3*a*) at the bottom for accommodating a second fastener (not shown in FIG. 4) of the plurality of fasteners (112, FIG. 3*a*) for coupling with floor assembly (118).

A third pillar (128*c*) of the at least four pillars (128*a*, 128*b*, 128*c*, 128*d*) include a second vertical post guide rail (not shown in FIG. 4). The second vertical post guide rail (not shown in FIG. 4) is configured to be coupled with the roof assembly (104).

A fourth pillar (128*d*) (not shown in FIG. 4) of the at least four pillars (128*a*, 128*b*, 128*c*, 128*d*) is operatively coupled with the roof assembly (104) by means of a second vertical post (not shown in FIG. 4) with a third perforated bracket (not shown in FIG. 4) of the plurality of brackets (108, FIG. 3*a*). The fourth pillar of the at least four pillars (128*a*, 128*b*, 128*c*, 128*d*) is operatively coupled to the floor assembly by means of a fourth perforated bracket (not shown in FIG. 4) at the bottom for accommodating a third fastener (not shown in FIG. 4) of the plurality of fasteners (112, FIG. 3*a*) for coupling with the floor assembly (118, FIG. 3*b*).

In one embodiment, the first pillar includes a U-shaped first vertical post 132 at the top side with a C-shaped bracket 134 for connecting with the roof assembly 102. The first pillar also includes an L-shaped vertical bracket 136 that accommodates a semicircular plate 138 with a central hole, for connecting with the floor assembly 118.

In one embodiment, the second perforated bracket (not shown in FIG. 4) may be a semi-hexagonal-shaped bracket to accommodate the second fastener (not shown in FIG. 4) for coupling with the floor assembly 118. In another embodiment, the second pillar (not shown in FIG. 4) may include a V-shaped vertical post guide rail for providing a connection with the roof assembly 102 and the floor assembly 118, wherein the V-shaped vertical post guide rail counterweights the elevator 200.

In one embodiment, the third pillar (not shown in FIG. 4) may include a U-shaped second vertical post guide rail for guiding the elevator 200 in a predefined direction.

In one embodiment, the fourth pillar (not shown in FIG. 4) includes a U-shaped third vertical post and a C-shaped third perforated bracket. The C-shaped bracket includes welded nuts 126 configured to couple with a roof structure of an elevator cabin. In another embodiment, the fourth pillar (not shown in FIG. 4) includes a semi-hexagonal-shaped bracket at the bottom and includes a plurality of holes 140 to accommodate the third fastener (not shown in FIG. 4) for coupling with the floor assembly 118.

Figure 5A:
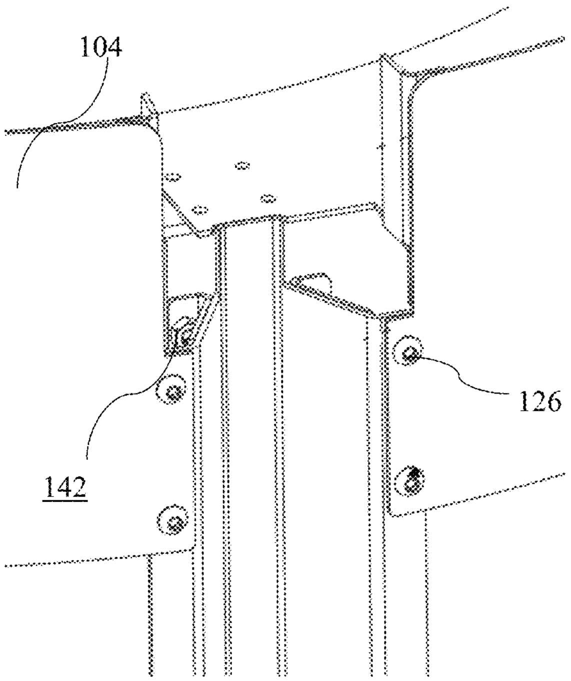
FIG. 5*a* a schematic representation of a perspective view of the connection of a fourth pillar of at least four pillars of the modular cabin assembly with the roof assembly of FIG. 1, in accordance with an embodiment of the present disclosure.
Figure 5B:
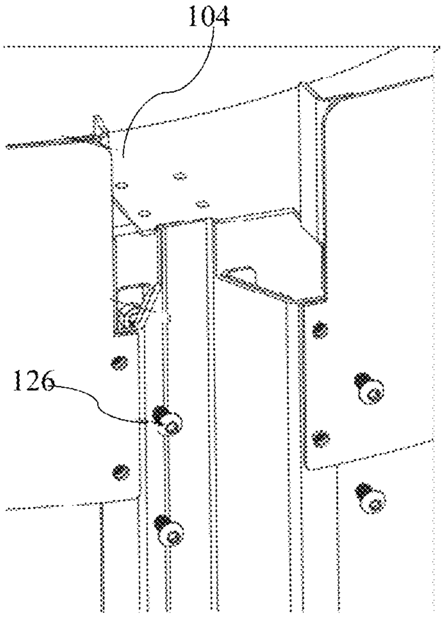
FIG. 5*b* is a schematic representation of an exploded view of the connection of the fourth pillar of at least four pillars of the modular cabin assembly with the roof assembly of FIG. 1, in accordance with an embodiment of the present disclosure.

FIG. 5*a* a perspective view of the connection of a fourth pillar (not shown in FIG. 5) of at least four pillars 128 with the roof assembly 102 of FIG. 1 in accordance with an embodiment of the present disclosure and FIG. 5*b* is an exploded view of the connection of the fourth pillar (not shown in FIG. 5) of at least four pillars 128 roof assembly 102 of FIG. 1, in accordance with an embodiment of the present disclosure. In one embodiment, the plurality of nuts 126 is welded along with the fourth pillar (not shown in FIG. 5). In another embodiment, the fourth pillar (not shown in FIG. 5) may be positioned at the front right-hand side of the modular cabin assembly 100. The fourth pillar 128 and the roof assembly 102 are assembled with a socket pan head bolt 142.

Figures 6A, 6B:
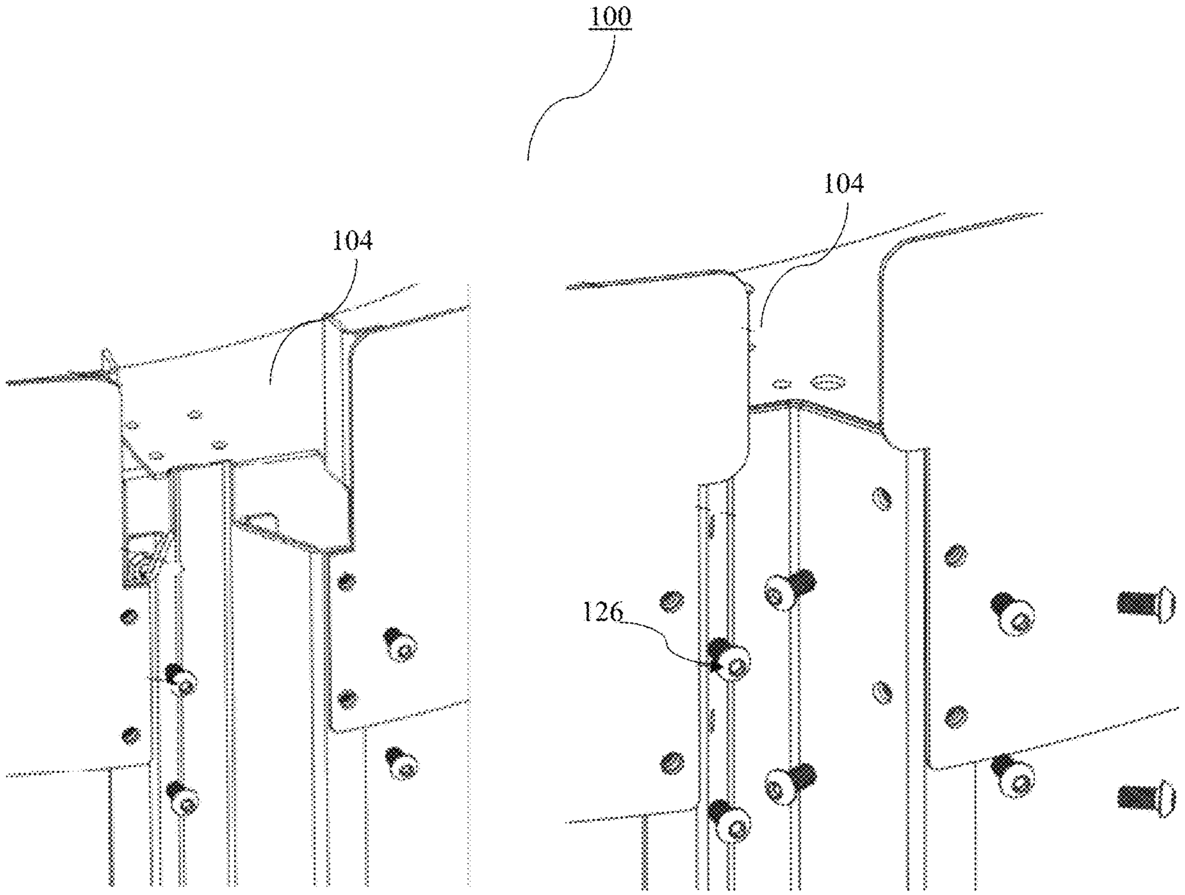
FIG. 6*a* a schematic representation of a perspective view of the connection of a second pillar of at least four pillars of the modular cabin assembly with the roof assembly of FIG. 1, in accordance with an embodiment of the present disclosure.
FIG. 6*b* a schematic representation of an exploded view of the connection of the second pillar of at least four pillars of the modular cabin assembly with the roof assembly of FIG. 1, in accordance with an embodiment of the present disclosure.

FIG. 6*a* a perspective view of the connection of a second pillar (not shown in FIG. 6*a*)*of* at least four pillars of the modular cabin assembly (100) with the roof assembly (102) of FIG. 1, in accordance with an embodiment of the present disclosure and FIG. 6*b* an exploded view of the connection of the second pillar (not shown in FIG. 6*a*) of at least four pillars (128) of the modular cabin assembly (100) with the roof assembly (102) of FIG. 1, in accordance with an embodiment of the present disclosure. In one embodiment, the second pillar (not shown in FIG. 6*a*) may be positioned at the rear right-hand side of at least four pillars. In another embodiment, a plurality of nuts (126) is welded along with the second pillar (not shown in FIG. 6*a*). The roof assembly (104) is assembled to the second pillar (not shown in FIG. 6*a*) with the socket pan head bolt (not shown in FIG. 6*a*).

Figure 7A:
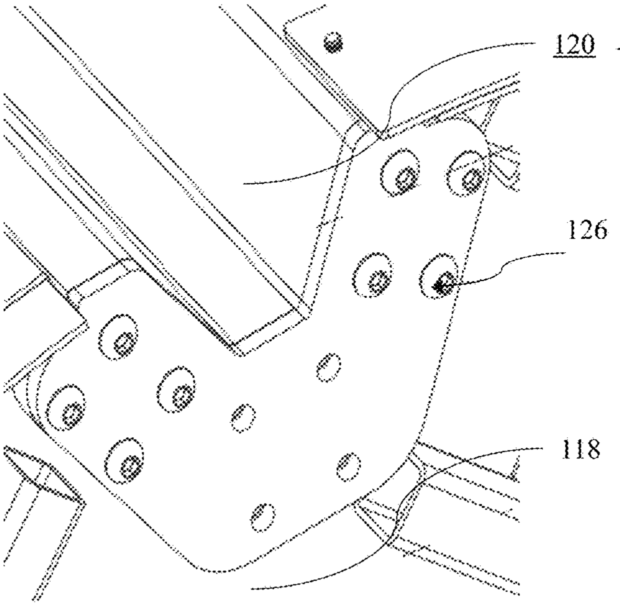
FIG. 7*a* is a schematic representation of a perspective view of the connection of the fourth pillar of at least four pillars of the modular cabin assembly with the floor assembly of FIG. 1, in accordance with an embodiment of the present disclosure.
Figure 7B:
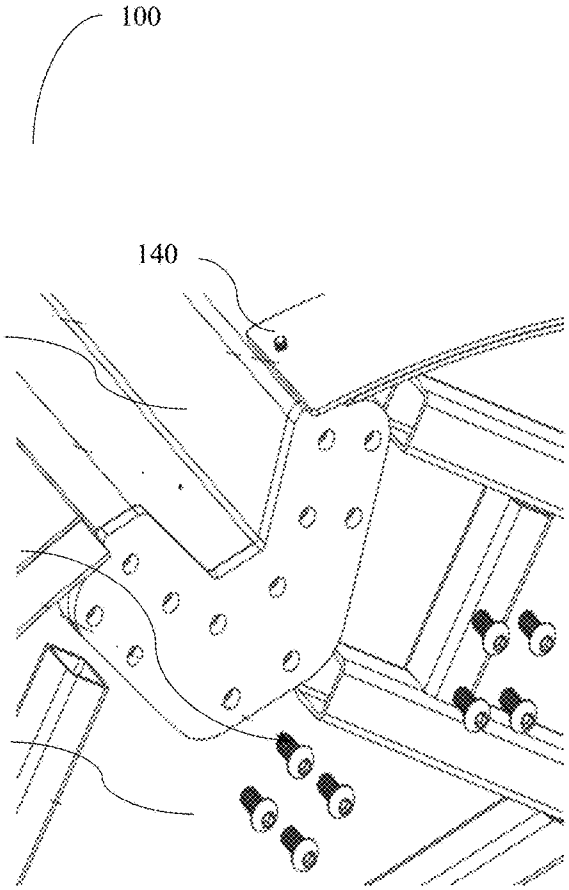
FIG. 7*b* is a schematic representation of an exploded view of the connection of the fourth pillar of at least four pillars of the modular cabin assembly with the floor assembly of FIG. 1, in accordance with an embodiment of the present disclosure.

FIG. 7*a* is a perspective view of the connection of the fourth pillar (not shown in FIG. 7*a*) of at least four pillars of the modular cabin assembly (100) with the floor assembly (118) of FIG. 1, in accordance with an embodiment of the present disclosure and FIG. 7*b* is an exploded view of the connection of the fourth pillar (not shown in FIG. 7*b*) of at least four pillars of the modular cabin assembly with the floor assembly (118) of FIG. 1, in accordance with an embodiment of the present disclosure. In one embodiment, the fourth pillar (not shown in FIG. 7*b*) is positioned front right-hand side of at least four pillars. The plurality of nuts (126) is welded along with the fourth pillar (not shown in FIG. 7*b*). The floor assembly (118) and the plurality of protruding portions (120) are assembled to the fourth pillar (not shown in FIG. 7*b*) with a socket pan head bolt (140).

Figures 8A, 8B:
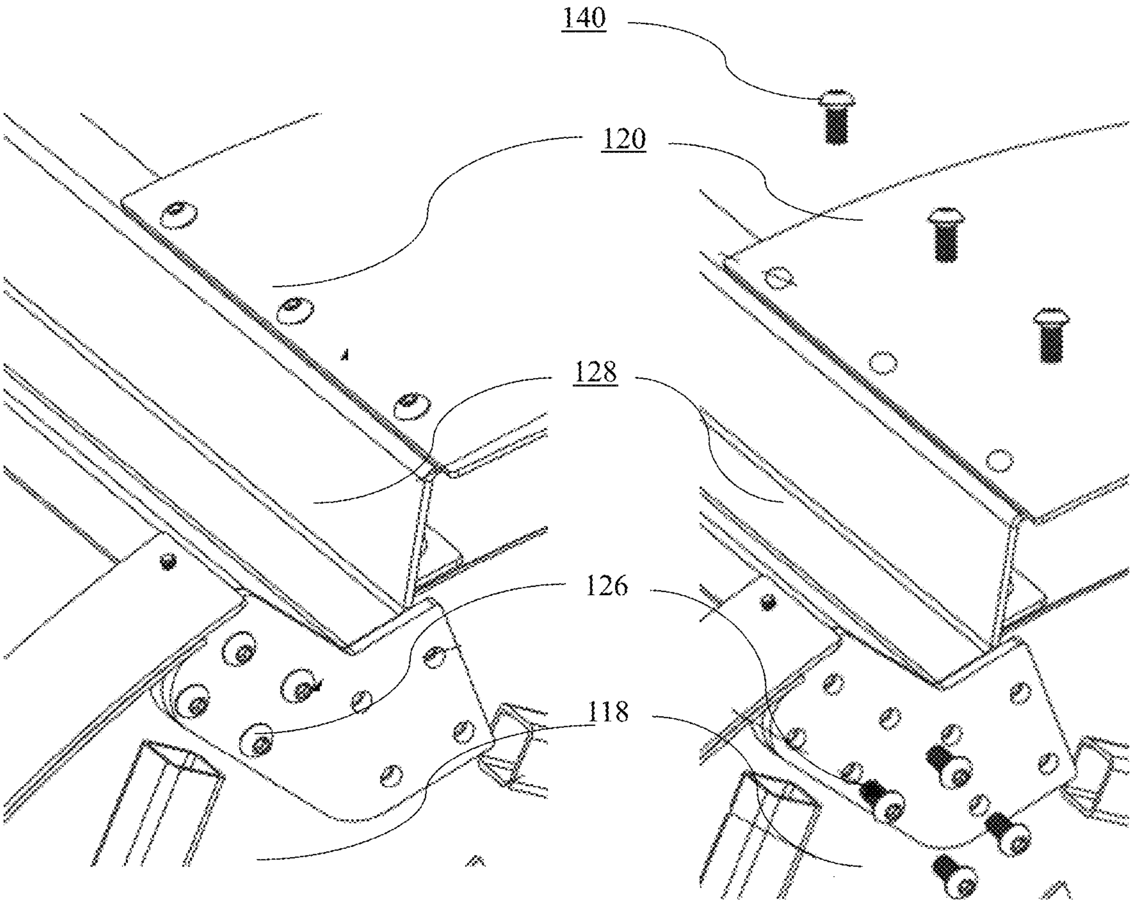
FIG. 8*a* is a schematic representation of a perspective view of the connection of a first pillar of at least four pillars of the modular cabin assembly with the floor assembly of FIG. 1, in accordance with an embodiment of the present disclosure.
FIG. 8*b* a schematic representation of an exploded view of the connection of the first pillar of at least four pillars of the modular cabin assembly with the floor assembly of FIG. 1, in accordance with an embodiment of the present disclosure.

FIG. 8*a* is a perspective view of the connection of a first pillar (not shown in FIG. 8*a*) of at least four pillars 128 of the modular cabin assembly with the floor assembly 118 of FIG. 1, in accordance with an embodiment of the present disclosure and FIG. 8*b* an exploded view of the connection of the first pillar (not shown in FIG. 8*a*) of at least four pillars 128 of the modular cabin assembly with the floor assembly (118) of FIG. 1, in accordance with an embodiment of the present disclosure. In one embodiment, the first pillar (not shown in FIG. 8*a*) is positioned at the rear left-hand side of at least four pillars 128. The plurality of nuts 126 is welded along with the first pillar (not shown in FIG. 8*a*). The floor assembly 118 and the plurality of protruding portions 120 is assembled to the first pillar (not shown in FIG. 8*b*) with M6 socket pan head bolt 140.

Figure 9:
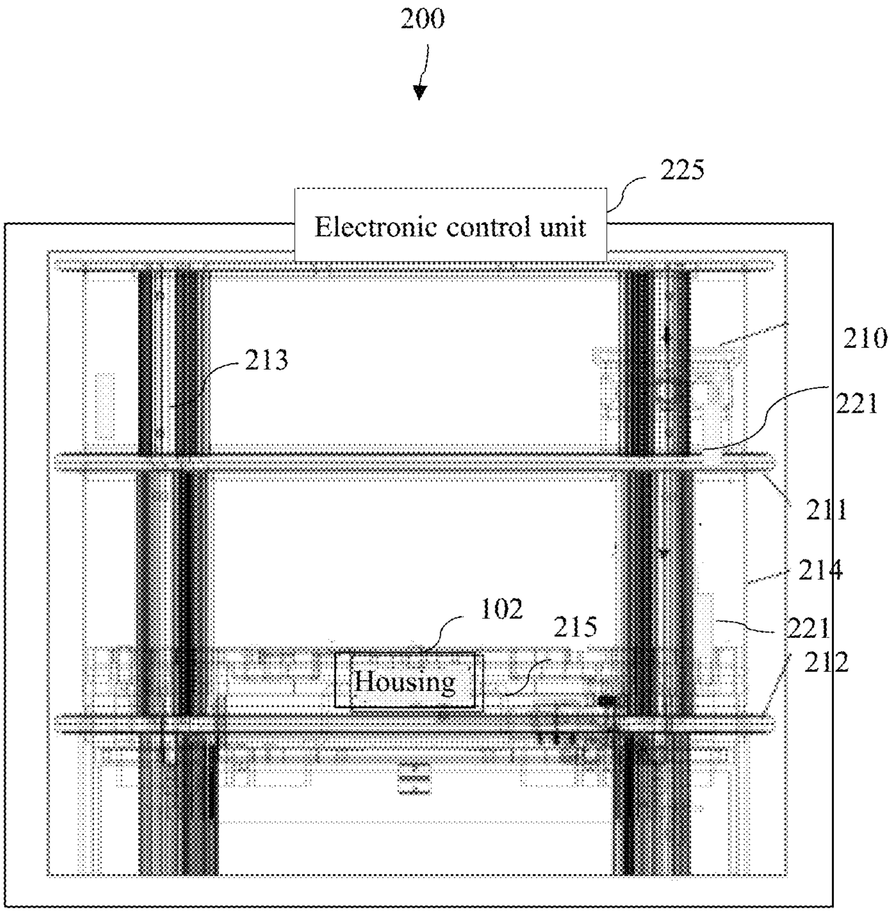
FIG. 9 is a schematic representation of the pneumatic vacuum elevator in accordance with an embodiment of the present disclosure.

FIG. 9 is a schematic representation of a pneumatic vacuum elevator 200 in accordance with an embodiment of the present disclosure. The elevator 200 includes an external cylinder assembly 210 comprising a modular elevator cabin assembly 100 inserted therein, wherein the external cylinder assembly 210 comprises a plurality of cylinders coupled using a base ring assembly 211 and a band ring assembly 212. The modular elevator cabin assembly 100 includes a housing 102 configured to move vertically. The housing includes a roof assembly 104 a floor assembly 118, and at least four pillars 128. The roof assembly 104 includes a plurality of first connectors 106 configured to be connected with a plurality of perforated brackets 108. The plurality of perforated brackets 108 is operatively coupled to a plurality of vertical posts 110. The plurality of vertical posts 110 is operatively coupled with the plurality of perforated brackets 108 by means of a plurality of fasteners 112, thereby forming a closed structure of the housing 102. The plurality of vertical posts 112 is operatively coupled with each other by means of a plurality of joints 114, wherein each of the plurality of joints 114 comprises a projection 116 at a top face of each joint. The floor assembly 118 is operatively coupled with the roof assembly 102. The floor assembly 118 includes a plurality of protruding portions 120, positioned at a predefined location creating a gap between each of the plurality of protruding portions 120. The floor assembly 118 also includes a covering structure 122 configured with a plurality of second connectors 124 forming a covering for a plurality of cables 126 of the elevator 200.

At least four pillars 128 are operatively connected to the roof assembly 102 and the floor assembly 118. A first pillar (not shown in FIG. 9) of the at least four pillars operatively coupled with the roof assembly 102 by means of a first vertical post (not shown in FIG. 9) of the plurality of vertical posts 110. The first pillar (not shown in FIG. 9) is operatively coupled with the floor assembly 118 by means of a first perforated bracket (not shown in FIG. 9) of the plurality of perforated brackets 108. The first perforated bracket 108*a* accommodates a first fastener (not shown in FIG. 9) of the plurality of fasteners 112 for coupling the first pillar with the floor assembly 118. A second pillar (not shown in FIG. 9) of the at least four pillars operatively coupled with the roof assembly 102 by means of a first vertical post guide rail (not shown in FIG. 9).

The second pillar (not shown in FIG. 9) is operatively coupled with the floor assembly 118 by means of a second perforated bracket (not shown in FIG. 9) of the plurality of perforated brackets 108 at the bottom for accommodating a second fastener (not shown in FIG. 9) of the plurality of fasteners 112 for coupling with floor assembly 118.

A third pillar (not shown in FIG. 9) of the at least four pillars include 128 a second vertical post guide rail (not shown in FIG. 4), wherein the second vertical post guide rail (not shown in FIG. 9) is configured to be coupled with the roof assembly 102.

A fourth pillar (not shown in FIG. 9) of the at least four pillars 128 operatively coupled with the roof assembly 102 by means of a second vertical post (not shown in FIG. 9) with a third perforated bracket (not shown in FIG. 9) of the plurality of brackets 108. Also, the fourth pillar (not shown in FIG. 9) of the at least four pillars 128 operatively coupled with the floor assembly by means of a fourth perforated bracket (not shown in FIG. 9) at the bottom for accommodating a third fastener (not shown in FIG. 9) of the plurality of fasteners 112 for coupling with the floor assembly 118.

Further, the elevator 200 includes a polycarbonate sheet 214 configured to cover the external cylinder assembly 210, wherein the polycarbonate sheet 214 and the external cylinder assembly 210 are coupled using a first locking device and a second locking device, wherein the first locking device is configured to lock an air gap between the polycarbonate sheet 214, the base ring assembly 211 and the external cylinder assembly 210 and the second locking device is configured to lock air gap between the polycarbonate sheet 214 and the guide rail pillar 213.

Furthermore, the elevator 200 includes a seal assembly 215 adapted to fit over a top portion of the elevator cabin 220, wherein the seal assembly 215 is configured to seal the elevator cabin 220 to reduce vibrations during upward and downward movement of the elevator cabin 220. The seal assembly 215 comprises a depressurizing system configured to prevent the elevator cabin from coming into force contact with the external cylinder assembly during upward movement and contribute to the safety of an elevator operation.

Furthermore, the elevator 200 includes an electronic control unit 225 located on top of the external cylinder assembly 210.

Figure 10A:
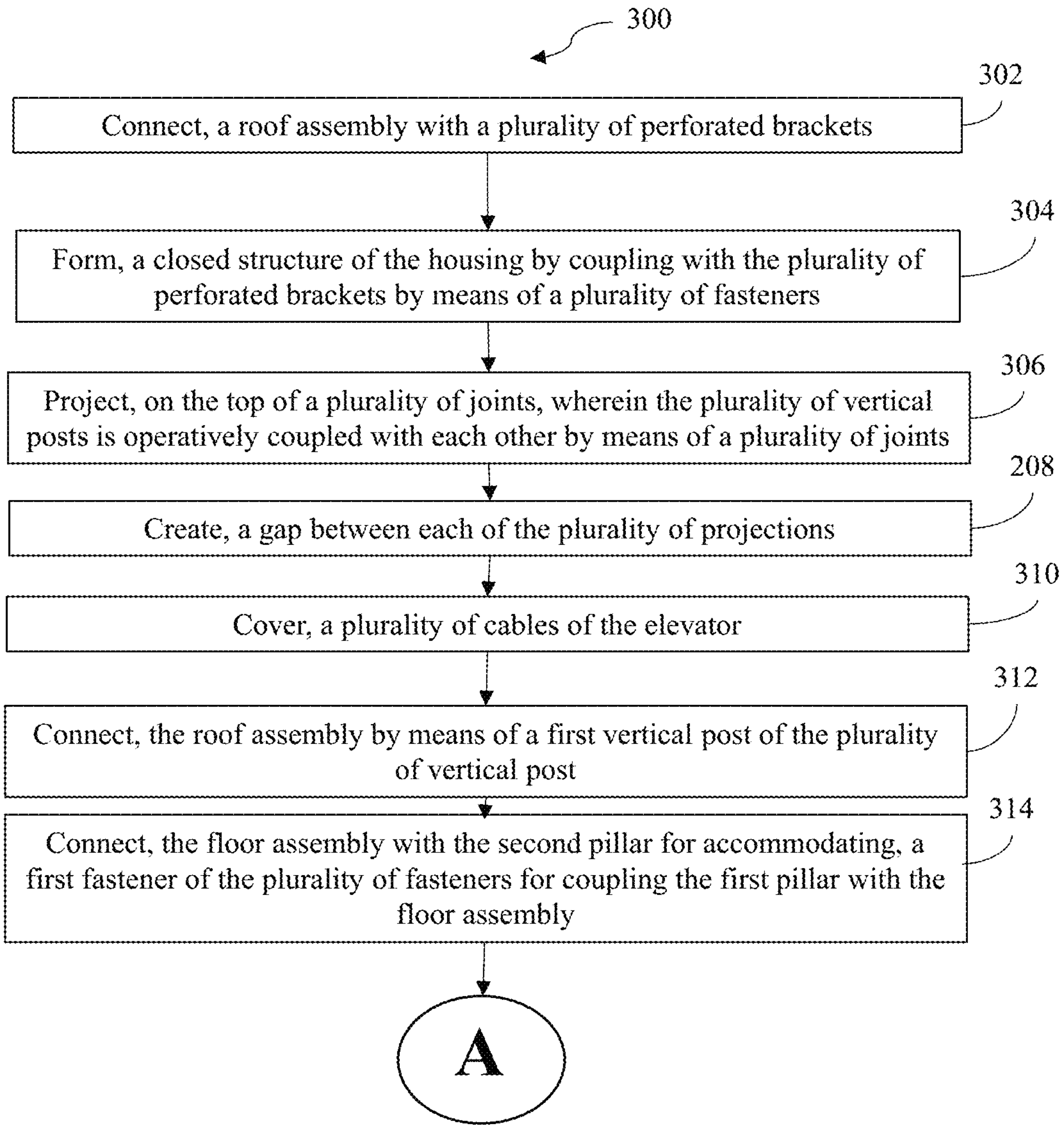
FIG. 10*a* is a flow chart representing the steps involved in a method for operating the modular cabin assembly in accordance with an embodiment of the present disclosure.
Figure 10B:
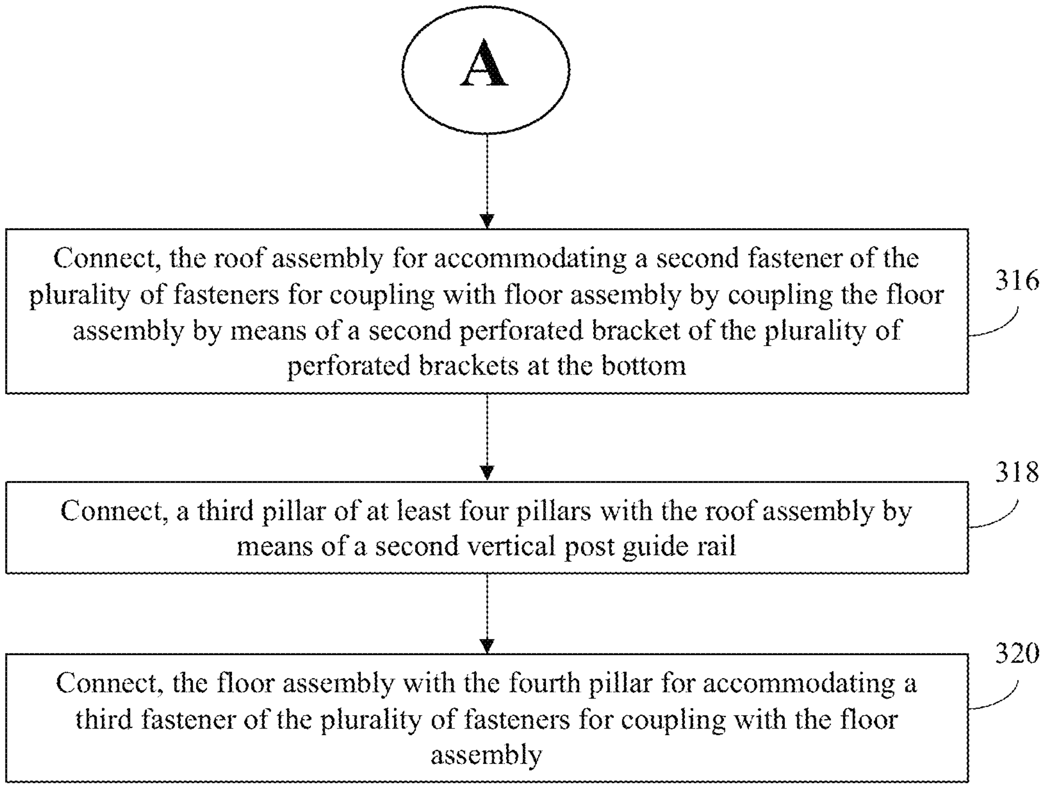
FIG. 10*b* is a flow chart representing the continued steps involved in a method for operating the modular cabin assembly in accordance with an embodiment of the present disclosure.

FIG. 10*a* is a flow chart representing the steps involved in a method 300 to operate the modular elevator cabin assembly in accordance with an embodiment of the present disclosure and FIG. 10*b* is a flow chart representing the steps involved in a method 300 to operate the modular elevator cabin assembly in accordance with an embodiment of the present disclosure. The method 300 includes connecting, by a plurality of first connectors of a housing, a roof assembly with a plurality of perforated brackets in step 302.

The method 300 also includes forming, by a plurality of vertical posts of the housing, a closed structure of the housing by coupling with the plurality of perforated brackets by means of a plurality of fasteners in step 304.

Further, the method 300 also includes projecting, by the plurality of vertical posts of the housing, on the top of a plurality of joints, wherein the plurality of vertical posts is operatively coupled with each other by means of a plurality of joints in step 306.

Furthermore, the method 300 includes creating, by a plurality of protruding portions of a floor assembly, a gap between each of the plurality of projections in step 308. The method also includes facilitating, the at least four pillars to fit into the gaps.

Furthermore, the method 300 covering, by a covering structure of the floor assembly, a plurality of cables of the elevator in step 310.

Furthermore, the method 300 includes connecting, by a first pillar of at least four pillars, with the roof assembly, by means of a first vertical post of the plurality of vertical posts in step 312. The method also includes connecting, the roof with the first pillar assembly by means of a U-shaped first vertical post at the top side with a C-shaped bracket. The method also includes connecting, the floor assembly with the first pillar by means of an L-shaped vertical bracket that accommodates a semicircular plate with a central hole.

Furthermore, the method 300 includes connecting, by a first perforated bracket of the first pillar of the at least four pillars, the floor assembly with the second pillar for accommodating, a first fastener of the plurality of fasteners for coupling the first pillar with the floor assembly in step 314.

Furthermore, the method 300 includes connecting, by a first vertical post guide rail of a second pillar of the at least four pillars, the roof assembly for accommodating a second fastener of the plurality of fasteners for coupling with floor assembly by coupling the floor assembly by means of a second perforated bracket of the plurality of perforated brackets at the bottom in step 316. The method also includes accommodating, the second fastener for coupling with the floor assembly, wherein the second perforated bracket is a semi-hexagonal-shaped bracket. The method also includes connecting, the second pillar with roof assembly by means of V-shaped vertical post guide rail and the floor assembly 118, wherein the V-shaped vertical post guide rail counterweights the elevator.

Furthermore, the method 300 includes connecting, a third pillar of at least four pillars with the roof assembly by means of a second vertical post guide rail in step 318. The method also includes guiding, the elevator in a predefined direction by a U-shaped second vertical post guide rail.

Furthermore, the method 300 includes connecting, by a fourth perforated bracket of a fourth pillar of the at least four pillars, the floor assembly with the fourth pillar for accommodating a third fastener of the plurality of fasteners for coupling with the floor assembly in step 320. The method also includes coupling, a plurality of welded nuts with a roof structure of an elevator cabin by a U-shaped third vertical post and a C-shaped third perforated bracket, wherein the C-shaped bracket. The method also includes accommodating, the third fastener for coupling with the floor assembly by a plurality of holes of a semi-hexagonal-shaped bracket.

Furthermore, the method 300 includes a cylindrical-shaped housing. The method also includes projecting, a cylindrical projection on the top face of the plurality of joints, wherein the plurality of joints 114 is elliptically shaped. The method also includes providing, modularity to the housing for being dismantled and assembled.

Various embodiments of the provide a modular elevator cabin assembly. The cabin assembly disclosed in the present disclosure does not require manpower to spend more time. The present disclosure provides effortless construction of the basic structures of the elevator system. The present disclosure facilitates an easy way of setting up the elevator system, wherein setting up the elevator system requires less time. The present disclosure provides easy dismantling of the elevator cabin. Also, the present disclosure is used for the shifting of the elevator system by dismantling and assembling the elevator easily. Thus, the present disclosure facilitates easy mobility of an elevator cabin. The existing elevator system does not provide comfortable packaging for the elevator. The system has intelligent, efficient, energy-saving advantages which result in significant economic benefit and social benefits. The control unit stabilizes the pneumatic elevator and controls it on an architectural basis. The control unit also provides high stability and strong anti-interference ability.

The modular cabin assembly disclosed in the present disclosure provides easy access to the items inside the building. The modular cabin assembly is easy to carry and for logistics as it is packed in dismantled condition.

Furthermore, there is no intention to be bound by any expressed or implied theory presented in the preceding technical field, background, brief summary or the detailed description. It is also to be understood that the specific devices and processes illustrated in the attached drawings, and described in the specification, are simply exemplary embodiments of the inventive concepts defined in the appended claims. Hence, specific dimensions and other physical characteristics relating to the embodiments disclosed herein are not to be considered as limiting, unless the claims expressly state otherwise.

While specific language has been used to describe the disclosure, any limitations arising on account of the same are not intended. As would be apparent to a person skilled in the art, various working modifications may be made to the method (250) in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A modular cabin assembly for an elevator comprises:
- a housing configured to move vertically, wherein the housing comprises:
  - a roof assembly comprising a plurality of first connectors configured to be connected with a plurality of perforated brackets, wherein the plurality of perforated brackets is operatively coupled to a plurality of vertical posts,
  - a wherein the plurality of vertical posts is operatively coupled with the plurality of perforated brackets by means of a plurality of fasteners, thereby forming a closed structure of the housing, and
  - wherein the plurality of vertical posts is operatively coupled with each other by means of a plurality of joints, wherein each of the plurality of joints comprises a projection 116 at a top face of each joint;
  - floor assembly operatively coupled with the roof assembly, wherein the floor assembly comprises:

a plurality of protruding portions, positioned at a predefined location creating a gap between each of the plurality of protruding portions; and a covering structure configured with a plurality of second connectors forming a covering for a plurality of cables of the elevator; and at least four pillars operatively connected the roof assembly and the floor assembly, wherein a first pillar of the at least four pillars operatively coupled with the roof assembly by means of a first vertical post of the plurality of vertical posts; and the floor assembly by means of a first perforated bracket of the plurality of perforated brackets, wherein the first perforated bracket accommodates a first fastener of the plurality of fasteners for coupling the first pillar with the floor assembly, wherein a second pillar of the at least four pillars operatively coupled with the roof assembly by means of a first vertical post guide rail; and the floor assembly by means of a second perforated bracket of the plurality of perforated brackets at the bottom for accommodating a second fastener of the plurality of fasteners for coupling with floor assembly, wherein a third pillar of the at least four pillars comprise a second vertical post guide rail, wherein the second vertical post guide rail is configured to be coupled with the roof assembly, and wherein a fourth pillar of the at least four pillars operatively coupled with:

the roof assembly by means of a second vertical post with a third perforated bracket of the plurality of brackets; and the floor assembly by means of a fourth perforated bracket at the bottom with for accommodating a third fastener of the plurality of fasteners for coupling with the floor assembly.

2. The modular cabin assembly as claimed in claim 1, wherein the housing comprises a cylindrical shape.

3. The modular cabin assembly as claimed in claim 1, wherein the plurality of joints is elliptically shaped comprising a cylindrical projection on the top face of the joint of the plurality of joints.

4. The modular cabin assembly as claimed in claim 1, wherein the first pillar comprises:

a U-shaped first vertical post at the top side with a C-shaped bracket for connecting with the roof assembly; and an L-shaped vertical bracket accommodates a semicircular plate with a central hole, for connecting with the floor assembly.

5. The modular cabin assembly as claimed in claim 1, wherein the second perforated bracket is a semi-hexagonal-shaped bracket to accommodate the second fastener for coupling with the floor assembly.

6. The modular cabin assembly as claimed in claim 1, wherein the second pillar comprises a V-shaped vertical post guide rail for providing a connection with the roof assembly and the floor assembly, wherein the V-shaped vertical post guide rail counterweights the elevator.

7. The modular cabin assembly as claimed in claim 1, wherein the third pillar comprises a U-shaped second vertical post guide rail for guiding the elevator in a predefined direction.

8. The modular cabin assembly as claimed in claim 1, wherein the fourth pillar comprises:

a U-shaped third vertical post and a C-shaped third perforated bracket, wherein the C-shaped bracket comprises a plurality of welded nuts configured to couple with a roof structure of an elevator cabin; and a semi-hexagonal-shaped bracket at the bottom comprises a plurality of holes to accommodate the third fastener for coupling with the floor assembly.

9. The modular cabin assembly as claimed in claim 1, wherein the housing is adapted to provide modularity for being dismantled and assembled.

10. A method comprising:

connecting, by a plurality of first connectors of a housing, a roof assembly with a plurality of perforated brackets;

forming, by a plurality of vertical posts of the housing, a closed structure of the housing by coupling with the plurality of perforated brackets by means of a plurality of fasteners;

projecting, by the plurality of vertical posts of the housing, on the top of a plurality of joints, wherein the plurality of vertical posts is operatively coupled with each other by means of a plurality of joints;

creating, by a plurality of protruding portions of a floor assembly, a gap between each of the plurality of projections;

covering, by a covering structure of the floor assembly, a plurality of cables of the elevator;

connecting, by a first pillar of at least four pillars, with the roof assembly, by means of a first vertical post of the plurality of vertical post;

connecting, by a first perforated bracket of the first pillar of the at least four pillars, the floor assembly with the second pillar for accommodating, a first fastener of the plurality of fasteners for coupling the first pillar with the floor assembly;

connecting, by a first vertical post guide rail of a second pillar of the at least four pillars, the roof assembly for accommodating a second fastener of the plurality of fasteners for coupling with floor assembly by coupling the floor assembly by means of a second perforated bracket of the plurality of perforated brackets at the bottom;

connecting, a third pillar of at least four pillars with the roof assembly by means of a second vertical post guide rail; and connecting, by a fourth perforated bracket of a fourth pillar of the at least four pillars, the floor assembly with the fourth pillar for accommodating a third a fastener of the plurality of fasteners for coupling with the floor assembly.

11. A pneumatic vacuum elevator comprising:

an external cylinder assembly comprising a modular elevator cabin assembly inserted therein, wherein the external cylinder assembly comprises a plurality of cylinders coupled using a base ring assembly and a band ring assembly, wherein the modular elevator cabin assembly comprises:

a housing configured to move vertically, wherein the housing comprises:

a roof assembly comprising a plurality of first connectors configured to be connected with a plurality of perforated brackets, wherein the plurality of perforated brackets is operatively coupled to a plurality of vertical posts, wherein the plurality of vertical posts is operatively coupled with the plurality of perforated brackets by means of a plurality of fasteners, thereby forming a closed structure of the housing, and wherein the plurality of vertical posts is operatively coupled with each other by means of a plurality of joints, wherein each of the plurality of joints comprises a projection at a top face of each joint;

a floor assembly operatively coupled with the roof assembly, wherein the floor assembly comprises:

a plurality of protruding portions, positioned at a predefined location creating a gap between each of the plurality of protruding portions; and a covering structure configured with a plurality of second connectors forming a covering for a plurality of cables of the elevator; and at least four pillars operatively connected the roof assembly and the floor assembly, wherein a first pillar of the at least four pillars operatively coupled with the roof assembly by means of a first vertical post of the plurality of vertical posts; and the floor assembly by means of a first perforated bracket of the plurality of perforated brackets, wherein the first perforated bracket accommodates a first fastener of the plurality of fasteners for coupling the first pillar with the floor assembly;

wherein a second pillar of the at least four pillars operatively coupled with the roof assembly by means of a first vertical post guide rail; and the floor assembly by means of a second perforated bracket of the plurality of perforated brackets at the bottom for accommodating a second fastener of the plurality of fasteners for coupling with floor assembly;

wherein a third pillar of the at least four pillars comprise a second vertical post guide rail, wherein the second vertical post guide rail is configured to be coupled with the roof assembly; and wherein a fourth pillar of the at least four pillars operatively coupled with:

the roof assembly by means of a second vertical post with a third perforated bracket of the plurality of brackets; and the floor assembly by means of a fourth perforated bracket at the bottom with for accommodating a third fastener of the plurality of fasteners for coupling with the floor assembly;

a polycarbonate sheet configured to cover the external cylinder assembly, wherein the polycarbonate sheet and the external cylinder assembly is coupled using a first locking device and a second locking device, wherein the first locking device is configured to lock an air gap between the polycarbonate sheet, the base ring assembly and the external cylinder assembly and the second locking device is configured to lock air gap between the polycarbonate sheet and the guide rail pillar;

a seal assembly adapted to fit over a top portion of the elevator cabin, wherein the seal assembly is configured to seal the elevator cabin to reduce vibrations during upward and downward movement of the elevator cabin, wherein the seal assembly comprises a depressurizing system configured to prevent the elevator cabin from coming into force contact with the external cylinder assembly during upward movement and contribute to the safety of an elevator operation; and an electronic control unit located on top of the external cylinder assembly.

* * * * *